United States Patent [19]

Bich

[11] Patent Number: 4,527,780
[45] Date of Patent: Jul. 9, 1985

[54] PISTON LOCKING FOR GAS SPRINGS
[75] Inventor: René Bich, Maisons-Laffitte, France
[73] Assignee: Societe J.G. Allinquant, Gentilly, France
[21] Appl. No.: 352,554
[22] Filed: Feb. 26, 1982
[30] Foreign Application Priority Data
  Feb. 27, 1981 [FR] France .................. 81 03968
[51] Int. Cl.³ ............................................. F16F 5/00
[52] U.S. Cl. ................................. 267/64.12; 92/30; 267/120; 296/56; 403/375; 403/377
[58] Field of Search ............... 267/64.11, 64.12, 64.13, 267/120; 188/79.5 B, 79.5 GE, 196 P, 322.17; 92/1, 18, 15, 30, 13.4; 16/1 C, 48.5, 58, DIG. 7, 53, 60, DIG. 16, DIG. 21; 160/188, 189, 191, 192; 296/56; 403/375, 377

[56] References Cited

U.S. PATENT DOCUMENTS

| 2,515,493 | 7/1950 | Buono | 403/377 |
|---|---|---|---|
| 3,947,006 | 3/1976 | Bauer et al. | 267/120 |
| 4,078,778 | 3/1978 | Hubweber | 267/64.12 |
| 4,096,927 | 6/1978 | Takatsu | 92/30 |
| 4,099,292 | 7/1978 | McCabe | 16/48.5 |
| 4,240,619 | 12/1980 | Wirges et al. | 267/64.11 |
| 4,272,064 | 6/1981 | Katsumori et al. | 267/64.11 |
| 4,323,224 | 4/1982 | Freitag et al. | 267/64.12 |

FOREIGN PATENT DOCUMENTS

| 2757232 | 7/1978 | Fed. Rep. of Germany ... 267/64.11 |
|---|---|---|
| 1069114 | 7/1954 | France . |
| 2243372 | 4/1975 | France . |
| 2347575 | 11/1977 | France . |
| 539498 | 9/1941 | United Kingdom . |
| 949426 | 2/1964 | United Kingdom . |
| 1161859 | 8/1969 | United Kingdom . |

Primary Examiner—Bruce H. Stoner, Jr.
Assistant Examiner—Robert J. Oberleitner
Attorney, Agent, or Firm—Watson, Cole, Grindle & Watson

[57] ABSTRACT

A pneumatic or gas spring includes a cylinder filled with gas under pressure and a piston which is slidably movable in the cylinder, the piston being fitted at the end of a rod which is gastightly and slidably guided through a closure bottom of the cylinder. The piston rod is lockable in its extreme extension position out of the cylinder by means of a snap ring fitted on the piston rod which cooperates with a localized constriction or step protruding inwardly from the cylinder wall adjacent its rod guide bottom, the snap ring having an external diameter intermediate between the inner diameters of the cylinder and the constriction or step.

8 Claims, 2 Drawing Figures

PISTON LOCKING FOR GAS SPRINGS

BACKGROUND OF THE INVENTION

It is common in the automobile industry to use springs to alleviate the muscular effort required to raise heavy car body panels, such as engine hoods, hatchbacks and trunk lids. Moreover, it is customary to replace such mechanical springs which have become worn with cylinder-and-piston telescoping apparatus called pneumatic springs or gas springs. A description of the construcion and operation of such springs is given in U.S. Pat. No. 4,089,512 to Allinquant et al.

With respect to these gas springs, the force thereof is a function of the gas pressure therein, which is called in the art "inflating pressure". At the same time, the gas filling the cylinder is subjected to Boyle's law, which amounts to saying that the bearing effort will, mutatis mutandis, be much higher on sultry days than during very cold weather. Since it is necessary that, under all circumstances, a person even of limited strength should be able to close the hood or the hatchback of the car against the action of the gas spring, the manufacturer will have to determine the inflating pressure by taking into account the highest temperatures likely to be encountered, say during the hot hours of a summer day when the car has remained exposed to the sun.

On the other hand, during reverse meteorological conditions, i.e., during cold weather, the gas spring will prove "slack" and possibly even too weak to maintain the hood or hatchback in its raised position, which can then unexpectedly fall and cause injury to the person leaning at that moment over the engine or the trunk.

It has already been proposed to overcome this danger by providing the gas spring with a mechanical system for locking it in its extended position which corresponds to the open position of the hood or hatchback.

Such prior art systems are described in U.S. Pat. No. 3,947,006 to Bauer et al., as well as French Pat. No. 2,347,575 to Automobiles Peugeot, which patents both call for an annular groove forming a recess in the cylinder wall at the adequate axial level which will be engaged by a resilient lock member associated with the piston when this member reaches this axial level. Such prior art arrangements, while effectively meeting the specified object, have nevertheless a few drawbacks:

during mounting of the apparatus in the workshop, it is necessary to radially inwardly compress the resilient member in order to introduce it into the cylinder and to secure it to the piston. This requires sophisticated machinery and renders difficult the automation of the mounting process;

in use, the resilient member exerts permanent friction on the cylinder wall all along its length, which friction unduly increases resistance and prematurely wears out the essential parts.

An object of the present invention is to provide improvements to such prior art systems by facilitating automated production of the gas spring, improving its operative conditions and increasing its life.

SUMMARY OF THE INVENTION

According to the present invention, the mechanical lock device comprises basically on the one hand a localized constriction or step protruding inwardly from the cylinder wall of the apparatus near its bottom which guides the piston rod, and on the other hand a snap ring fitted thereon and having an external diameter slightly greater than the internal diameter of this constriction. This ring can conveniently be loosely or floatingly fitted on the piston side facing of the rod-guide bottom.

In a preferred embodiment of the invention, the subject ring is heat sensitive and designed for increasing in diameter when its temperature decreases, and conversely. It can be conveniently made of a mere bimetal strip in the form of a split ring, the metal layer of higher thermal expansion coefficient being located on the outside of the ring.

For example, good results have been obtained with bimetal strips marketed by the METALIMPHY Company under reference 108.SP.

Thus, during cold weather, i.e., when the gas spring becomes "slack", the snap ring will have an increased diameter and ensure an effective locking effect by clipping of the piston rod on the cylinder constriction. Of course, during hot weather, i.e., when the gas spring becomes "tough", the ring will have a smaller diameter and the subject clipping will be less sharp, if at all; but this is then of no importance since the spring, being "tough", will amply suffice to prevent spontaneous fall back of the hood or hatchback from an open position.

DESCRIPTION OF THE PREFERRED EMBODIMENT

Figures 1, 2:
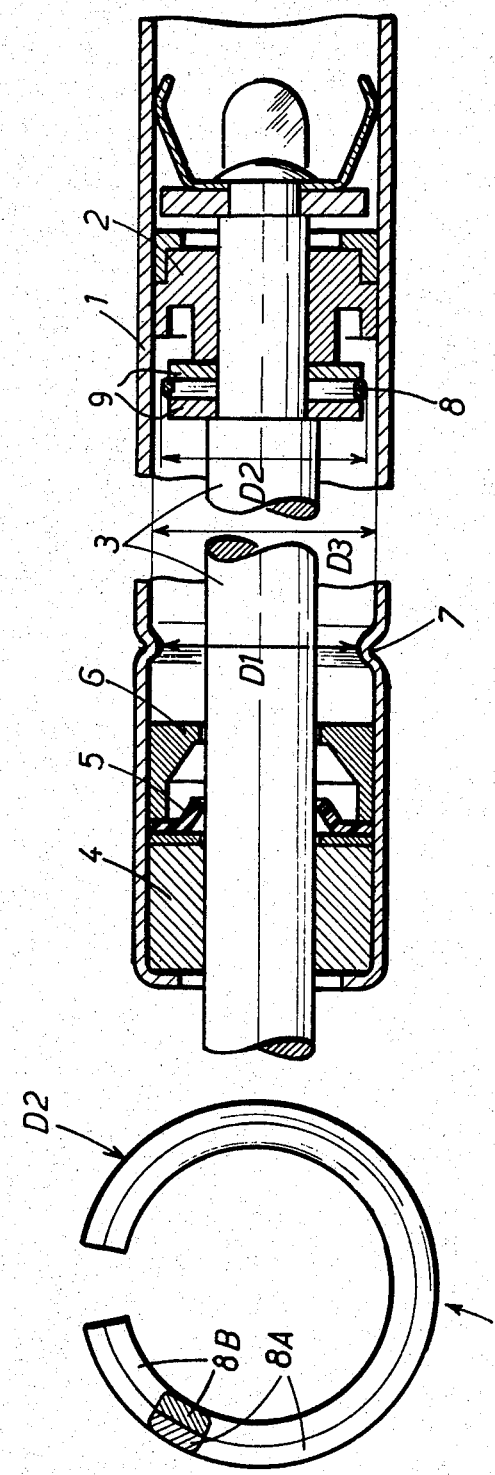
FIG. 1 is a fragmentary axial section of an improved gas spring according to a preferred embodiment of the present invention.
FIG. 2 illustrates a detail on a larger scale.

Likewise to the above-mentioned U.S. Pat. No. 4,089,512, the present gas spring comprises basically a tube or cylinder 1 filled with pressure gas which slidably accomodates a piston 2 that is fitted to the end of a rod 3 that extends through the cylinder bottom 4. The cylinder bottom 4 is designed as usual for guiding rod 3, while ensuring effective gastightness thanks to a seal device 5 associated with a lubricant retainer plug 6.

In accordance with the present invention, this gas spring—which is otherwise conventional—has a twofold novelty:

1. On the wall of tube 1, adjacent the bottom parts 4, 5 and 6, there is provided (by rolling) a circular constriction 7 of rounded protruding outline and of internal diameter D1.

2. On rod 3, adjacent piston 2 and at the side thereof facing rod-guide bottom 4, there is provided a snap ring 8 having an external diameter D2 slightly greater than D1 while still smaller than the inner diameter D3 of tube 1. Snap ring 8 is mounted loosely or floatingly around rod 3, being just sandwiched between two washers 9,9 which are also loosely or floatingly fitted around the rod 3. (Disregarding the loose fit of the sandwich, this arrangement bears some similarity with the one disclosed in British Pat. No. 539,498 to Marconi).

It is thus apparent that, by sliding piston 2 towards the rod-guide bottom 4, this being the extension direction of the telescopic device, ring 8 will engage constriction 7 and, contracting resiliently under the cam effect of the latter, will overreach the internal protrusion formed by constriction 7, thus ensuring a locking of piston rod 3 by resilient clipping of snap ring 8. This simple mechanical stop provides a blocking the telescopic apparatus in its extended position.

When it is desired to retract it from this extended position, all one has to do then is exert a stronger, though extremely brief, force in order to pass over the clipping point; thereafter the normal force/displacement curve of any conventional gas spring is met.

Most preferably, snap ring 8 is constituted by a bimetallic split ring shown on FIG. 2 and designed for "opening out" when temperature drops, so that at low temperatures its diameter D2 be effectively greater than D1, thus ensuring safe locking of the apparatus by clipping as described above. To this effect, the bimetallic tape is curved in the sense which puts at the outside the metal layer 8A of larger thermal expansion coefficient, and at the inside the metal layer 8B of smaller expansibility.

Obviously, the machining of the above continuous circular constriction 7 by rolling over the whole periphery of tube 1, may be replaced by a number of localized, arcuately-spaced peripheral bosses projecting inwardly from the cylinder wall 1, the internal diameter D1 being then that of the inscribed circle on which the peaks of the bosses lie.

I claim:

1. In a gas spring which includes a cylinder filled with pressure gas and a piston fitted endwise of a rod which is gastightly guided through a cylinder bottom and which is lockable in its extreme extension position out of said cylinder against untimely retraction into said cylinder, the improvement wherein the cylinder wall includes a localized constriction protruding inwardly therefrom adjacent said bottom thereof, and wherein a resiliently yieldable, contractile snap ring is fitted on said piston rod, which snap ring has at rest an external diameter slightly larger than the internal diameter of said constriction, said snap ring being heat sensitive such that its external diameter at rest will increase with a decrease in its temperature and decrease with an increase in its temperature, said constriction and snap ring being designed for mutual cam type engagement upon said snap ring overreaching said constriction at the end of the extension stroke of said rod out of said cylinder, whereby said snap ring is caused by engagement with said constriction to yieldingly contract on passing over the latter and thereafter resiliently expand back to its rest diameter once beyond said constriction, said constriction and snap ring being thereby interlocked to arrest retraction of said rod into said cylinder.

2. Gas spring as claimed in claim 1, wherein said external diameter of said snap ring is slightly smaller than the internal diameter of said cylinder.

3. Gas spring as claimed in claim 2, wherein the snap ring, which is inwardly spaced from, and out of engagement with, the cylinder wall except at the constriction thereof, is fitted loosely on said rod at the side of said piston which faces said cylinder bottom, whereby said snap ring is floatingly mounted.

4. Gas spring as claimed in claim 1, wherein said heat-sensitive snap ring comprises a bimetallic strip formed into a split ring having on its outside the metal layer which is of greater thermal expansion coefficient and on its inside the metal layer of smaller expansibility.

5. In a gas spring which includes a cylinder filled with pressurized gas, said cylinder defining an interior and including a bottom at one end having a bore therethrough; a piston which is slidingly movable in the interior of said cylinder, the periphery of said piston providing a gastight seal with said cylinder, and a piston rod slidingly extending through said bore and into the interior of said cylinder, said piston rod being connected to said piston, the periphery of said piston rod providing a gastight seal with said bore in said cylinder bottom, the improvement wherein (1) said cylinder includes at a point along its length a radially inwardly extending ridge, said ridge defining a constricted internal diameter within the interior of said cylinder and dividing the interior of said cylinder into a first zone nearest said cylinder bottom and a second zone farthest from said cylinder bottom, and (2) a resiliently yieldable, contractible snap ring is fitted on said piston rod at a point within said cylinder, said snap ring defining an intrinsic external diameter which is slightly larger than said constricted internal diameter of said cylinder, said snap ring being made of materials which are heat sensitive, such that said intrinsic external diameter of said snap ring will increase with a decrease in its temperature and decrease with an increase in its temperature; said radially inwardly extending ridge of said cylinder and said resiliently yieldable contractile snap ring on said piston rod cooperating such that (a) starting from a position where said snap ring is located in said second zone within said cylinder, when said piston rod is moved out of said cylinder such that said piston attached thereto is moved toward said cylinder bottom, said snap ring on said piston rod will contact said radially inwardly extending ridge, then contract, and then move into said first zone within said cylinder, (b) once in said first zone and in the absence of a manual force applied to said piston rod, said snap ring will be retained in said first zone by said radially inwardly extending ridge, and (c) when said snap ring is located in said first zone and said piston rod is manually moved into said cylinder, thus moving said piston rod attached thereto away from said cylinder bottom, said snap ring will contact said radially inwardly extending ridge, then contract, and then move into said second zone.

6. The gas spring as defined in claim 5, wherein said snap ring is in the form of a split ring and is made of two different metal materials, a first metallic material on the radial outside of said split ring and a second metallic material on the radial inside of said split ring, said first metallic material having a greater expansion coefficient than said second metallic material.

7. The gas spring as defined in claim 5, wherein said cylinder has a standard inner diameter at points along its length except where said radially inwardly extending ridge is located, the intrinsic external diameter of said snap ring being slightly less than said standard inner diameter of said cylinder.

8. The gas spring as defined in claim 5, wherein said radially inwardly extending ridge extends around the entire circumference of said cylinder.

* * * * *